(12) United States Patent
Kulkarni et al.

(10) Patent No.: US 8,770,176 B2
(45) Date of Patent: Jul. 8, 2014

(54) FLUID CONTROL VALVE ASSEMBLY

(75) Inventors: Girish Sudhir Kulkarni, Maharashtra (IN); Subrata Sarkar, Durgapur (IN); Swethaghnya Kusa, Maharashtra (IN); Santosh Dadasaheb Pachpund, Maharashtra (IN); Bradley Noel Kippe, Goodrich, MI (US)

(73) Assignee: Eaton Corporation, Cleveland, OH (US)

( * ) Notice: Subject to any disclaimer, the term of this patent is extended or adjusted under 35 U.S.C. 154(b) by 532 days.

(21) Appl. No.: 13/184,762

(22) Filed: Jul. 18, 2011

(65) Prior Publication Data

US 2013/0019844 A1    Jan. 24, 2013

(51) Int. Cl.
*B60H 1/00* (2006.01)
*B60H 1/08* (2006.01)

(52) U.S. Cl.
USPC ........... 123/520; 137/861; 137/885; 137/887; 165/297; 248/362

(58) Field of Classification Search
CPC . F23N 2035/18; F23N 1/007; F23N 2035/16; F23N 1/027; B01D 29/21; B01D 35/143; F16K 11/0836
USPC .................. 123/520, 518, 275, 522; 137/895; 431/278, 280, 284; 126/116 R; 294/64.2; 118/50
See application file for complete search history.

(56) References Cited

U.S. PATENT DOCUMENTS

| | | | | |
|---|---|---|---|---|
| 1,661,002 A | * | 2/1928 | McClymont et al. | 417/181 |
| 3,181,563 A | * | 5/1965 | Giffen | 137/596 |
| 3,716,307 A | * | 2/1973 | Hansen | 417/191 |
| 4,200,124 A | * | 4/1980 | Stratynski et al. | 137/885 |
| 4,301,825 A | * | 11/1981 | Simko | 137/111 |
| 4,951,713 A | * | 8/1990 | Jordan et al. | 137/895 |
| 5,301,718 A | * | 4/1994 | Bolhofner | 137/893 |
| 5,427,151 A | * | 6/1995 | Pauley | 137/895 |
| 5,535,770 A | * | 7/1996 | Nurmi | 137/14 |
| 5,538,027 A | * | 7/1996 | Adamson et al. | 137/7 |
| 2004/0025851 A1 | * | 2/2004 | Krimmer et al. | 123/522 |
| 2011/0192844 A1 | * | 8/2011 | Erdmann et al. | 220/86.2 |
| 2012/0318244 A1 | | 12/2012 | Williams | |
| 2013/0160877 A1 | * | 6/2013 | Walter et al. | 137/565.22 |
| 2014/0010677 A1 | * | 1/2014 | Zmuda et al. | 417/178 |

FOREIGN PATENT DOCUMENTS

| | | |
|---|---|---|
| DE | 4311314 C1 | 3/1994 |
| DE | 102009009897 A1 | 8/2010 |
| DE | 102009024697 A1 | 12/2010 |

* cited by examiner

*Primary Examiner* — Stephen K Cronin
*Assistant Examiner* — Gonzalo Laguarda
(74) *Attorney, Agent, or Firm* — Quinn Law Group, PLLC

(57) ABSTRACT

A valve assembly includes a housing defining first, second, third, and fourth passages. The first passage channels relatively-high pressure fluid and the second passage channels relatively-low pressure fluid into the valve. The third passage connects to the second passage and releases fluid from the valve. The fourth passage connects to the first passage and the second passage and releases fluid from the valve. The valve assembly also includes a first check-valve that permits fluid flow from the second passage to the third passage and a second check-valve that permits fluid flow from the second passage to the fourth passage. The valve assembly additionally includes a nozzle that controls velocity of the relatively-high pressure fluid entering the fourth passage from the first passage. The relatively-low pressure fluid is pulled from the second passage into the fourth passage on the outer periphery of the nozzle by the relatively-high pressure fluid.

20 Claims, 4 Drawing Sheets

FLUID CONTROL VALVE ASSEMBLY

TECHNICAL FIELD

The present disclosure relates to a fluid control valve assembly.

BACKGROUND

Valves are employed in a multitude of industries to control flow of liquids and/or gases. One application for such control valves appears in vehicles with stored fuel to control a vehicle's evaporative emissions resulting from gasoline vapors escaping from the vehicle's fuel system. Evaporative emissions of modern vehicles are strictly regulated in many countries. To prevent fuel vapors from venting directly to the atmosphere, a majority of vehicles manufactured since the 1970's include specifically designed evaporative emissions systems. Additionally, in recent years vehicle manufacturers began developing fully sealed fuel delivery to their engines.

In a typical evaporative emissions system, vented vapors from the fuel system are sent to a purge canister containing activated charcoal. The activated charcoal used in such canisters is a form of carbon that has been processed to make it extremely porous, creating a very large surface area available for adsorption of fuel vapors and/or chemical reactions. During certain engine operational modes, with the help of specifically designed control valves, the fuel vapors are adsorbed within the canister. Subsequently, during other engine operational modes, and with the help of additional control valves, in naturally aspirated engines fresh air is drawn through the canister under engine vacuum, pulling the fuel vapor into the engine where it is burned.

However, while during operation a naturally aspirated engine mostly generates vacuum, a forced-induction engine regularly operates at positive pressures. As a result, evaporative emissions systems employed with forced-induction engines are generally distinct from those used with naturally aspirated engines.

SUMMARY

An embodiment of the invention is a valve assembly that includes a housing defining a first, second, third, and fourth passages. The first passage is configured to channel a relatively-high pressure fluid into the valve assembly, while the second passage is configured to channel a relatively-low pressure fluid into the valve assembly. The third passage is in fluid communication with the second passage and is configured to release fluid from the valve assembly. The fourth passage is in fluid communication with the first passage and the second passage and is configured to release fluid from the valve assembly.

The valve assembly also includes a first check-valve configured to permit fluid flow from the second passage to the third passage and a second check-valve configured to permit fluid flow from the second passage to the fourth passage. The valve assembly additionally includes a nozzle arranged between the first and fourth passages and is configured to control velocity of the relatively-high pressure fluid entering the fourth passage from the first passage. The relatively-low pressure fluid is pulled from the second passage into the fourth passage on the outer periphery of the nozzle by the relatively-high pressure fluid.

The valve assembly may be used as part of an evaporative emissions system in an internal combustion engine having a compressor configured to pressurize the engine's intake airflow.

The above features and advantages and other features and advantages of the present invention are readily apparent from the following detailed description of the best modes for carrying out the invention when taken in connection with the accompanying drawings.

DETAILED DESCRIPTION

Figure 1:
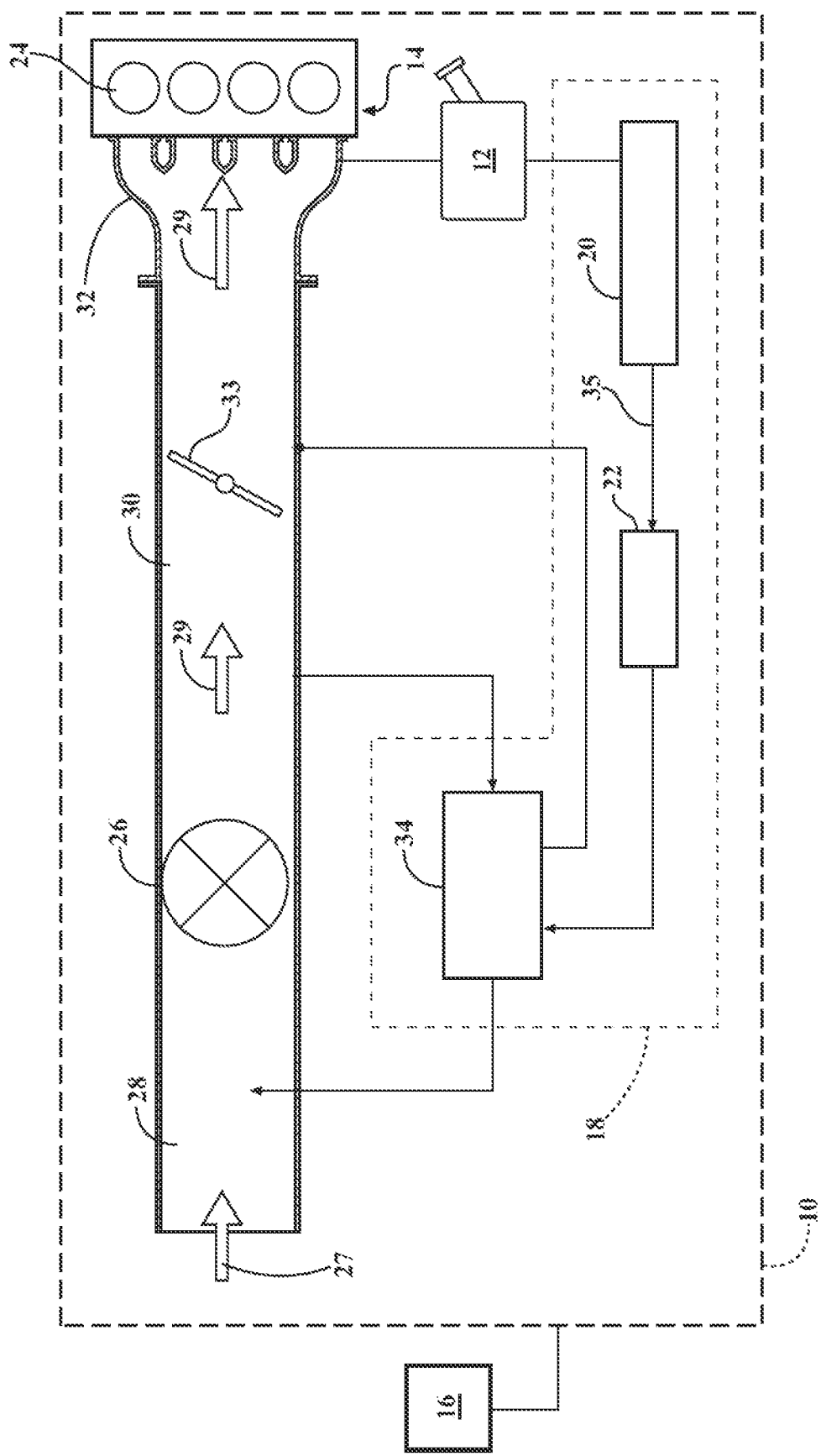
FIG. 1 is a schematic illustration of an evaporative emissions system in a forced-induction engine, with the system employing a valve assembly configured to control fuel vapor flow, according to one embodiment.

Referring to the drawings wherein like reference numbers correspond to like or similar components throughout the several figures, FIG. 1 illustrates a vehicle, schematically represented by numeral 10. The vehicle 10 includes a fuel tank 12 configured as a reservoir for holding fuel to be supplied to an internal combustion engine 14. The fuel tank 12 is part of a fuel system which typically also includes a fuel pump and fuel injectors (not shown), as understood by those skilled in the art. The engine 14 is configured to generate torque for powering the vehicle 10 and may be a spark or a compression ignition type.

The vehicle 10 also includes a controller 16 that is configured to regulate the operation of the engine 14 and its fuel system. The fuel tank 12 is operatively connected to an evaporative emissions control system 18 that includes a purge or carbon canister 20 configured to collect fuel vapor emitted by the fuel tank 12 and to subsequently release the fuel vapor to the engine 14. The controller 16 is also configured to regulate the operation of the evaporative emissions control system 18 in order to recapture and recycle the emitted fuel vapor by opening a purge valve 22.

The engine 14 includes cylinders 24 that receive appropriate amounts of fuel and air. As shown, the engine 14 employs forced-induction in the form of a compressor 26. The compressor 26 may be either an exhaust-driven turbocharger or a mechanically-driven supercharger, as appreciated by those skilled in the art. The compressor 26 is configured to enhance power output of the engine 14 by pressurizing an ambient airflow 27 that is used by the engine for combustion. A first air duct 28 is configured to deliver the ambient airflow 27 to the compressor 26 after the airflow is passed through an appropriate filter (not shown). The compressor 26 pressurizes the ambient airflow 27 and forces the now pressurized airflow 29 into a second air duct 30. The second air duct 30 is configured to deliver the pressurized airflow 29 from the compressor 26 to an intake manifold 32. Depending on a particular engine application, the compressor 26 may be capable of pressurizing the ambient airflow 27.

A throttle plate 33 is arranged between the second air duct 30 and the intake manifold 32, and is configured to control the amount of airflow, whether unpressurized ambient airflow 27 or pressurized airflow 29, entering the intake manifold 32. In turn, the intake manifold 32 distributes and channels the pressurized airflow 29 to the cylinders 24. To complement the increased amount of airflow generated by the compressor 26, an appropriate supply of fuel is typically injected into the cylinders 24 from the fuel tank 12 through specifically configured fuel injectors (not shown). The fuel delivery portion of each such fuel injector may be arranged either within the intake manifold 32 or directly inside a particular cylinder 24.

Figure 2:
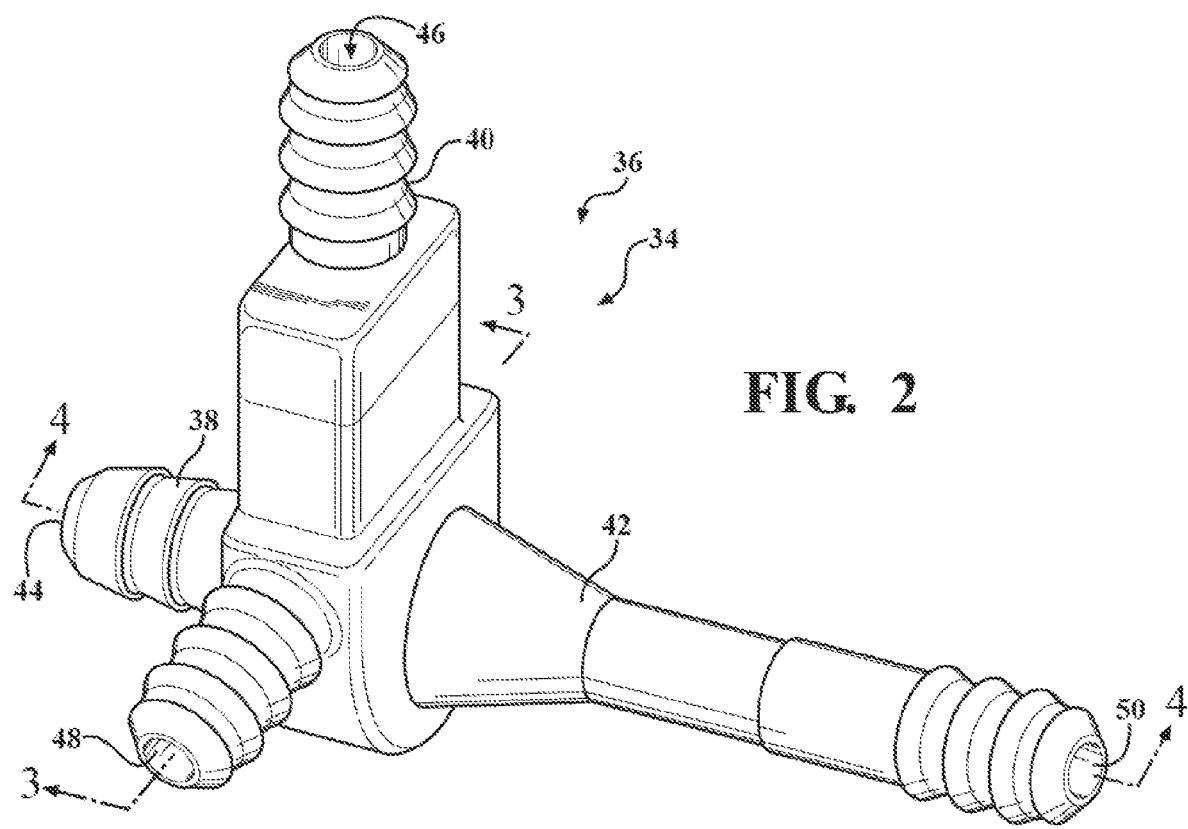
FIG. 2 is a perspective view of the valve assembly schematically shown in FIG. 1.
Figure 3:
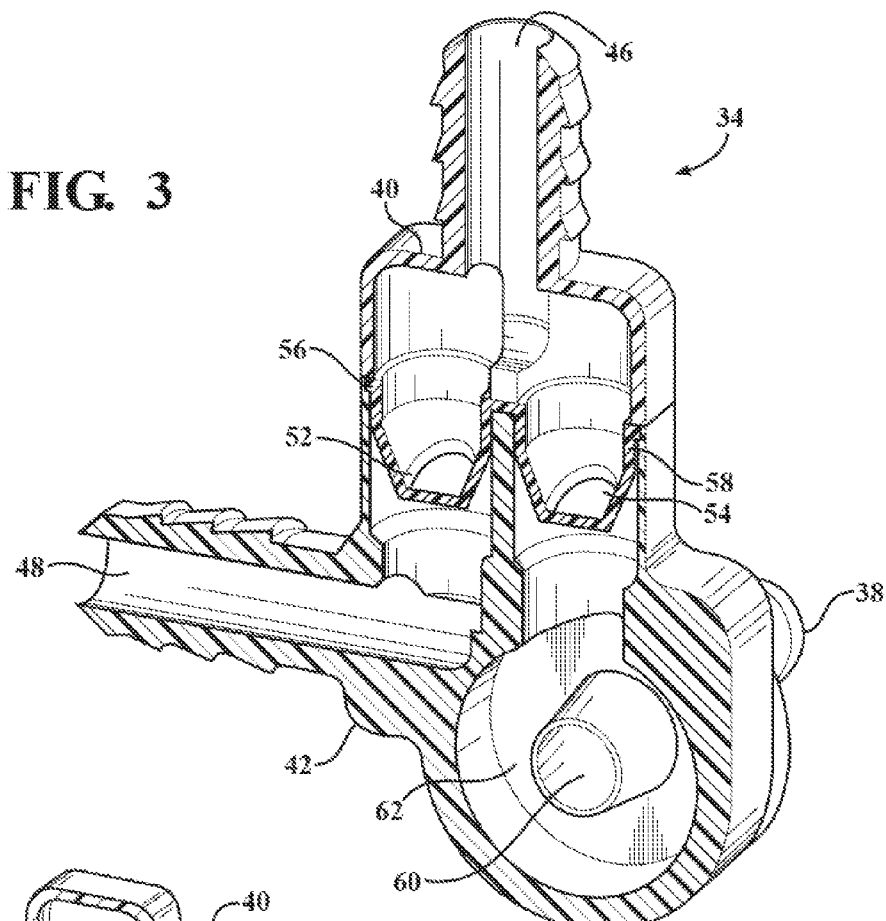
FIG. 3 is a perspective cross-sectional view of the valve assembly taken along section 3-3 shown in FIG. 2.
Figure 4:
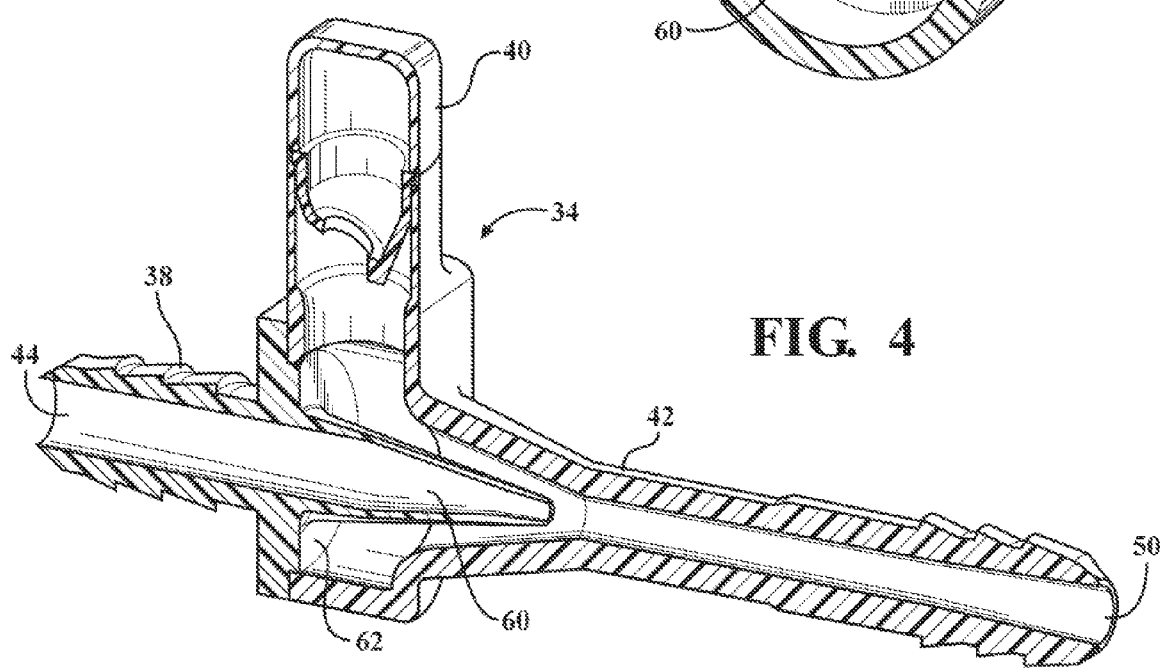
FIG. 4 is a perspective cross-sectional view of the valve assembly taken along section 4-4 shown in FIG. 2

The evaporative emissions control system 18 additionally includes a valve assembly 34. The valve assembly 34 is configured to control a flow of fuel vapor 35 between the engine 14 and the purge canister 20. The fuel vapor 35 is a relatively-low pressure fluid as compared with the relatively-high pressure fluid that is the compressor-generated pressurized airflow 29. As shown in FIGS. 2-4, the valve assembly 34 includes a housing 36, which retains all internal components of the valve assembly in a compact manner. The housing 36 includes a first housing section 38, a second housing section 40, and a third housing section 42. The first housing section 38 defines a first passage 44. The second housing section 40 defines a second passage 46. The third housing section 42 defines a third passage 48 and a fourth passage 50. The first passage 44 is in fluid communication with the second air duct 30 to channel the pressurized airflow 29 into the valve 34. The second passage 46 is in fluid communication with the carbon canister 20 to channel the fuel vapor 35 into the housing 36. The third passage 48 is in fluid communication with the second passage 46, and is configured to release the fuel vapor 35 into the intake manifold 32. The fourth passage 50 is in fluid communication with the first passage 44 and the second passage 46, and is configured to release the fuel vapor 35 into the first air duct 28.

FIG. 3 illustrates a cross-sectional view of the valve assembly 34 taken along a section 3-3 as denoted in FIG. 2. As shown in FIG. 3, the valve assembly 34 includes a first check-valve 52. The first check-valve 52 is arranged between the second passage 46 and the third passage 48, and is configured to permit one-way fluid flow in the direction from the second passage to the third passage. The valve assembly 34 additionally includes a second check-valve 54. The second check-valve 54 is arranged between the second passage 46 and the fourth passage 50, and is configured to permit one-way fluid flow in the direction from the second passage to the fourth passage. Although the check-valves 52, 54 are shown as flap-type, each of the check-valves may also be configured as a ball- or poppet-type.

As additionally shown in FIG. 3, the valve assembly 34 also includes a first check-valve holder 56 arranged inside the housing 36. The first check-valve holder 56 is configured to retain the first check-valve 52. Furthermore, the valve assembly 34 includes a second check-valve holder 58. The second check-valve holder 58 is similarly arranged inside the housing 36 and is configured to retain the second check-valve 54. Alternatively, the first and the second check-valve holders 56, 58 may be combined into and configured as a unitary component (as shown in FIG. 3).

FIG. 4 illustrates a cross-sectional view of the valve assembly 34 taken along a section 4-4 as denoted in FIG. 2. As shown in FIG. 4, the valve assembly 34 includes a convergent nozzle 60. As shown in FIG. 4, the nozzle 60 may be incorporated into and be defined by the first housing section 38. The nozzle 60 is arranged between the first passage 44 and the fourth passage 50, and is configured to increase velocity of the pressurized airflow 29 entering the fourth passage from the first passage. A cavity 62 surrounds the nozzle 60 and is in fluid communication with the second passage 46. After the pressurized airflow 29 traverses the nozzle 60 and exits into the fourth passage 50 with increased velocity, the pressurized airflow induces a vacuum in the cavity 62. The induced vacuum in the cavity 62 opens the second check-valve 54. Accordingly, the pressurized airflow 29 functions as a motive flow that pulls the fuel vapor 35 from the second passage 46 on the outer periphery of the nozzle 60 and into the fourth passage 50. Once the fuel vapor 35 enters the second passage 46, the fuel vapor mixes with pressurized airflow 29.

As depicted in FIG. 2, the first housing section 38 may be secured to the third housing section 42 after the nozzle 60 is arranged between the first passage 44 and the fourth passage 50. Additionally, the second housing section 40 may be secured to the third housing section 42 after the first and second check-valve holders 56, 58, along with the first and second check-valves 52, 54, are nested inside the third housing section 42. The first, second, and third housing sections 38, 40, 42 may be formed from an appropriate high strength and chemically resistant material, such as an engineering plastic. Furthermore, the first, second, and third housing sections 38, 40, 42 may be attached to one another via appropriate fasteners, or be secured to each another via a robust bonding process, such as sonic welding, snapping together, or adhesive bonding, or a combination of such processes. Following the bonding of the first, second, and third housing sections 38, 40, 42, the resultant housing 36 structure should be capable of withstanding pressures generated by the compressor 26 without leakage or other failures.

Figure 5:
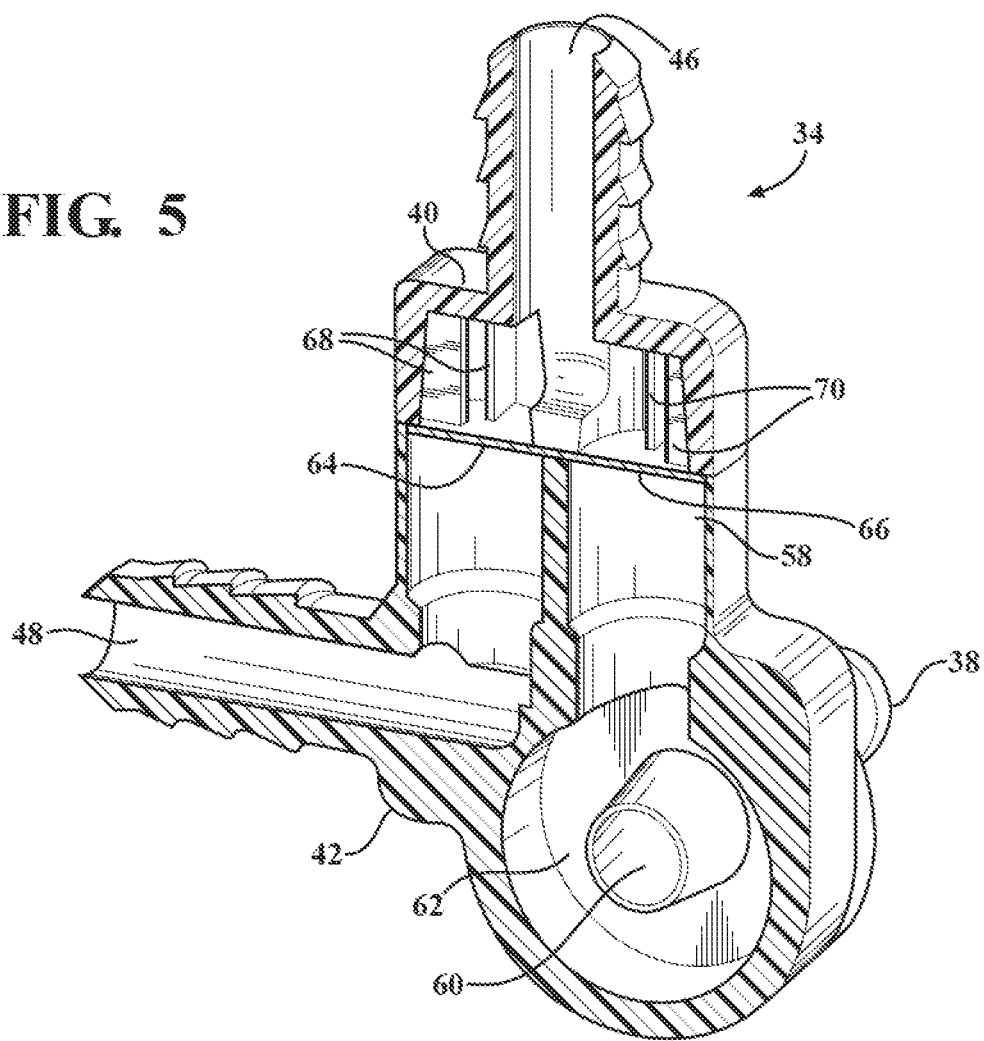
FIG. 5 is a perspective cross-sectional view of an alternative embodiment of the valve assembly taken along section 3-3 shown in FIG. 2.

FIG. 5 illustrates a cross-sectional view of an alternative embodiment of the valve assembly 34 taken along section 3-3 shown in FIG. 2. As shown in FIG. 5, the valve assembly 34 includes a first check-valve 64 that functions analogously to the first check-valve 52 of FIG. 3. The first check-valve 52 is arranged between the second passage 46 and the third passage 48, and is configured to permit one-way fluid flow in the direction from the second passage to the third passage. The valve assembly 34 additionally includes a second check-valve 66 that functions analogously to the second check-valve 54 of FIG. 3. The second check-valve 66 is arranged between the second passage 46 and the fourth passage 50, and is configured to permit one-way fluid flow in the direction from the second passage to the fourth passage. The first and second check-valves 64, 66 are shown as diaphragm-type.

As shown in FIG. 5, each of the check-valves 64, 66 is sandwiched between the second housing section 40 and the third housing section 42 and are retained thereby within the valve assembly 34. The first and second check-valves 64, 66 may be joined together into a single element, and thus be characterized by unitary construction, or be two discrete valve elements. The first check-valve 64 is supported by ribs 68 and the second check-valve 66 is supported by ribs 70 during operation of the valve assembly 34. As shown in FIG. 5, ribs 68 and 70 may be incorporated into the second housing section 40.

During operation of the engine 14, when the compressor 26 is operative and generating boost pressure, the pressurized airflow 29 enters the valve assembly 34 from the second air duct 30 downstream of the compressor and through the first passage 44. The pressurized airflow 29 passes through the nozzle 60 and induces vacuum in the cavity 62, thus opening the second check-valve 54. Once the purge valve 22 is opened, the fuel vapor 35 is purged from the carbon canister 20 into the valve assembly 34 via the second passage 46. Accordingly, both the purge valve 22 and the second check-valve 54 allow only forward flow from the carbon canister 20 toward the valve assembly 34 and prevent reverse flow. As previously described, the fuel vapor 35 is pulled via the motive flow created by the pressurized airflow 29 through the cavity 62 into the fourth passage 50 where the fuel vapor the pressurized airflow become mixed.

The combined pressurized airflow 29 and fuel vapor 35 is channeled from the fourth passage 50 to the first air duct 28 upstream of the compressor 26. In the first air duct 28 the mixed pressurized airflow 29 and fuel vapor 35 are additionally combined with the ambient airflow 27 and channeled into the compressor 26. Following the compressor 26, the fuel vapor 35 mixed with the airflow is passed through the second air duct 30 to the intake manifold 32, introduced into the cylinders 24, and combusted. Accordingly, in the above-described situation, the pressurized airflow 29 from the compressor 26 is employed as motive flow to purge the carbon canister 20.

During operation of the engine 14, when the compressor 26 is not operative and the throttle plate 33 is closed, a negative pressure, i.e., vacuum, condition is created inside the intake manifold 32. In such a situation, once the purge valve 22 is opened, the fuel vapor 35 is purged from the carbon canister 20 into the valve assembly 34. The first check-valve 52 is opened by the vacuum within the intake manifold 32. Accordingly, both the purge valve 22 and the first check-valve 52 allow only forward flow from the carbon canister 20 toward the valve assembly 34 and prevent reverse flow, which permits the fuel vapor to be directed into the third passage 48. From the third passage 48 the fuel vapor 35 is channeled to the intake manifold 32 downstream of the throttle plate 33. The fuel vapor 35 is subsequently pulled from the intake manifold 32 into the cylinders 24 and combusted.

While the best modes for carrying out the invention have been described in detail, those familiar with the art to which this invention relates will recognize various alternative designs and embodiments for practicing the invention within the scope of the appended claims.

The invention claimed is:

1. A valve assembly comprising:
    a housing;
    a first passage defined by the housing and configured to channel a relatively-high pressure fluid into the valve assembly;
    a second passage defined by the housing and configured to channel a relatively-low pressure fluid into the valve assembly;
    a third passage defined by the housing, in fluid communication with the second passage, and configured to release fluid from the valve assembly;
    a fourth passage defined by the housing, in fluid communication with the first passage and the second passage, and configured to release fluid from the valve assembly;
    a first check-valve configured to permit fluid flow from the second passage to the third passage;
    a second check-valve configured to permit fluid flow from the second passage to the fourth passage; and
    a nozzle arranged between the first and fourth passages and configured to control velocity of the relatively-high pressure fluid entering the fourth passage;
    wherein the relatively-low pressure fluid is pulled from the second passage into the fourth passage on the outer periphery of the nozzle by the relatively-high pressure fluid.

2. The valve assembly of claim 1, further comprising a first check-valve holder arranged inside the housing and configured to retain the first check-valve and a second check-valve holder arranged inside the housing and configured to retain the second check-valve.

3. The valve assembly of claim 2, wherein the first and the second check-valve holders are combined into and configured as a unitary component.

4. The valve assembly of claim 2, wherein the housing includes a first housing section defining the first passage, a second housing section defining the second passage, and a third housing section defining the third and fourth passages.

5. The valve assembly of claim 4, wherein the nozzle is defined by the first housing section.

6. The valve assembly of claim 4, wherein the first housing section is secured to the third housing section after the nozzle is arranged between the first and fourth passages, and the second housing section is secured to the third housing section after the first and second check-valve holders are arranged inside the housing.

7. The valve assembly of claim 6, wherein the first, second, and third housing sections are secured to one another via at least one of sonic welding, snapping together, and adhesive bonding.

8. The valve assembly of claim 1, wherein at least one of the first and second check-valves is one of flap-and diaphragm-type.

9. The valve assembly of claim 1, wherein at least one of the first and second check-valves is ball-type.

10. A vehicle comprising:
    an internal combustion engine having a cylinder and an intake manifold configured to channel an airflow into the cylinder;
    a compressor configured to pressurize the airflow for delivery to the intake manifold;
    a first air duct configured to deliver airflow to the compressor and a second air duct configured to deliver the pressurized airflow from the compressor to the intake manifold;
    a fuel system configured to supply fuel to the cylinder;
    a carbon canister configured to collect a fuel vapor from the fuel system; and
    a valve assembly including:
        a housing;
        a first passage defined by the housing and in fluid communication with the second air duct to channel the pressurized airflow into the valve assembly;
        a second passage defined by the housing, in fluid communication with the carbon canister to channel the fuel vapor into the housing;
        a third passage defined by the housing, in fluid communication with the second passage, and configured to release the fuel vapor into the intake manifold;
        a fourth passage defined by the housing, in fluid communication with the first passage and the second passage, and configured to release the fuel vapor into the first air duct;
        a first check-valve configured to permit fluid flow from the second passage to the third passage;
        a second check-valve configured to permit fluid flow from the second passage to the fourth passage; and
        a nozzle arranged between the first and fourth passages and configured to control velocity of the pressurized airflow entering the fourth passage from the first passage;
        wherein the fuel vapor is pulled from the second passage into the fourth passage on the outer periphery of the nozzle by the pressurized airflow.

11. The vehicle of claim 10, wherein the valve assembly additionally includes a first check-valve holder arranged inside the housing and configured to retain the first check-valve and a second check-valve holder arranged inside the housing and configured to retain the second check-valve.

12. The vehicle of claim 11, wherein the first and the second check-valve holders are combined into and configured as a unitary component.

13. The vehicle of claim 11, wherein the housing includes a first housing section defining the first passage, a second housing section defining the second passage, and a third housing section defining the third and fourth passages.

14. The vehicle of claim 13, wherein the nozzle is defined by the first housing section.

15. The vehicle of claim 13, wherein the first housing section is secured to the third housing section after the nozzle is arranged between the first and fourth passages, and the second housing section is secured to the third housing section after the first and second check-valve holders are arranged inside the housing.

16. The vehicle of claim 15, wherein the first, second, and third housing sections are secured to one another via at least one of sonic welding, snapping together, and adhesive bonding.

17. The vehicle of claim 10, wherein at least one of the first and second check-valves is one of flap-and diaphragm-type.

18. The vehicle of claim 10, wherein at least one of the first and second check-valves is ball-type.

19. A valve assembly comprising:
   a housing;
   a first passage defined by the housing and configured to channel a relatively-high pressure fluid into the valve assembly;
   a second passage defined by the housing and configured to channel a relatively-low pressure fluid into the valve assembly;
   a third passage defined by the housing, in fluid communication with the second passage, and configured to release fluid from the valve assembly;
   a fourth passage defined by the housing, in fluid communication with the first passage and the second passage, and configured to release fluid from the valve assembly;
   a first check-valve configured to permit fluid flow from the second passage to the third passage;
   a second check-valve configured to permit fluid flow from the second passage to the fourth passage;
   a unitary check-valve holder arranged inside the housing and configured to retain the first check-valve and the second check-valve; and
   a nozzle arranged between the first and fourth passages and configured to control velocity of the relatively-high pressure fluid entering the fourth passage from the first passage;
   wherein:
      the housing includes a first housing section defining the first passage, a second housing section defining the second passage, and a third housing section defining the third and fourth passages;
      the nozzle is defined by the first housing section; and
      the relatively-low pressure fluid is pulled from the second passage into the fourth passage on the outer periphery of the nozzle by the relatively-high pressure fluid.

20. The valve assembly of claim 19, wherein each of the first and second check-valves is one of a flap-type and a ball-type.

* * * * *